United States Patent [19]

Bomo et al.

[11] Patent Number: 5,089,554

[45] Date of Patent: Feb. 18, 1992

[54] SILICA REINFORCED ELASTOMERS

[75] Inventors: Francis Bomo, Lyon; Yvonick Chevallier, Decines; Patrick Lamy, Lyon; Jean-Claude Morawski, Chassieu, all of France

[73] Assignee: Rhone-Poulenc Chimie de Base, Courbevoie, France

[21] Appl. No.: 366,306

[22] Filed: Jun. 13, 1989

Related U.S. Application Data

[63] Continuation of Ser. No. 186,740, Apr. 25, 1988, abandoned, which is a continuation of Ser. No. 907,314, Sep. 15, 1986, abandoned.

[30] Foreign Application Priority Data

Sep. 15, 1985 [FR] France ................................ 85 13579

[51] Int. Cl.$^5$ ................................................. C08K 3/34
[52] U.S. Cl. ..................................... 524/493; 524/492
[58] Field of Search ............................... 524/492, 493

[56] References Cited

U.S. PATENT DOCUMENTS

| 4,059,558 | 11/1977 | Golombeck et al. | 524/493 |
| 4,251,281 | 2/1981 | Machurat et al. | 524/493 |
| 4,273,589 | 6/1981 | Nauroth et al. | 524/493 |
| 4,409,356 | 10/1983 | Lagarde et al. | 524/492 |
| 4,590,052 | 5/1986 | Chevallier et al. | 423/335 |

FOREIGN PATENT DOCUMENTS

| 11004 | 7/1984 | France . | |
| 0164345 | 9/1984 | Japan | 524/493 |

Primary Examiner—Paul R. Michl
Assistant Examiner—Patrick Niland
Attorney, Agent, or Firm—Burns, Doane, Swecker & Mathis

[57] ABSTRACT

Mechanically improved elastomeric shaped articles include reinforcing amounts of a particulate silica filler material, said silica filler material comprising at least one precipitated silica having (i) a CTAB surface area of from 20 to 200 m$^2$/g, (ii) a mean projected area of aggregates of greater than about 10,000 nm$^2$, and (iii) an inter-aggregate volume of at least 1 cm$^3$/g and an essentially homogeneous inter-aggregate pore population.

8 Claims, No Drawings

5,089,554

SILICA REINFORCED ELASTOMERS

This application is a continuation of application Ser. No. 186,740, filed Apr. 25, 1988, which in turn is a continuation of application Ser. No. 907,314, filed Sept. 15, 1986, now both abandoned.

BACKGROUND OF THE INVENTION

1. Field of the Invention

The present invention relates to the reinforcing of natural or synthetic elastomers by means of a particular silica composition.

2. Description of the Prior Art

A very large number of formulations exist in this art of rubber mixtures in which an elastomer constitutes the principal component, having regard for the multiplicity of uses for which such mixtures are intended: tires, shoe soles, cables, joints, seals, etc.

Other than the elastomer, such formulations typically include fillers, one of the main functions of which is to improve the mechanical properties of the elastomer. Among such fillers, carbon blacks are particularly widely used.

However, for a number of years attempts have been ongoing to replace carbon blacks with precipitated silicas, which are far more economical.

Nonetheless, replacing carbon blacks by silicas is not a simple matter. Indeed, reinforcing fillers owe certain of their properties to the morphology of their aggregates. As such morphology is different as between the silicas and carbon blacks, it will be appreciated that substantial differences may occur in regard to elastomers which are reinforced by one or another of such types of fillers.

Therefore, the present inventors have now carried out long-term studies to determine those types of silicas which are most suitable for reinforcing elastomers and, in particular, those which have reinforcing properties which are most akin to the reinforcing properties of carbon blacks.

As a result, a correlation has now been found between the morphological properties of silicas and the properties of elastomers reinforced with such fillers.

SUMMARY OF THE INVENTION

Accordingly, a major object of the present invention is the provision of improved silicas for the especially effective reinforcement of elastomeric shaped articles.

Briefly, the present invention features a reinforcing filler for an elastomer comprising at least one precipitated silica having the following characteristics:

(i) a CTAB surface area of from 20 to 200 m²/g;
(ii) a mean projected area of the aggregates thereof of greater than 10,000 nm²; and
(iii) a high inter-aggregate volume of at least 1 cm³/g and a homogeneous inter-aggregate pore population; with the proviso that:
  (a) for a CTAB surface area of from 20 to 70 m²/g, the projected area is at least 30,000 nm²;
  (b) for a CTAB surface area of from 70 to 120 m²/g, the projected area is at least 25,000 nm²;
  (c) for a CTAB surface area of from 120 to 200 m²/g, the projected area is at least 15,000 nm².

DETAILED DESCRIPTION OF THE PREFERRED EMBODIMENTS OF THE INVENTION

More particularly according to the present invention, in a preferred embodiment thereof, the filler may comprise a silica having a BET surface area/CTAB surface area ratio of from 1 to 1.2.

Moreover, silicas having the following more precise characteristics are especially advantageous:

a CTAB surface area of from 120 to 200 m²/g and a DBP oil absorption capacity of at most 300 ml/100 g.

Finally, as another example of preferred silicas according to the invention, representative are those which have a CTAB surface area of from 20 to 120 m²/g and a DBP oil absorption capacity of at most 300 ml/100 g.

It will be appreciated that this invention also features any process for reinforcing elastomers using those fillers as described hereinbefore.

It has now been found that the silicas having the foregoing characteristics display good dispersibility in elastomers, and thus impart especially attractive mechanical properties thereto.

As indicated above, to be suitable for use as reinforcing fillers, the silicas must have clearly defined characteristics.

Those characteristics are determined in the following manner:

The CTAB surface area is the external surface area, as evaluated by absorption of cetyl trimethyl ammonium bromide with a pH of 9, following the method set forth by JAY, JANSEN and C. KRAUS in *Rubber Chemistry and Technology*, 44, pages 1287–1296 (1971).

Oil absorption capacity is evaluated by the method set forth in French standard NF.T 30-022 (March 1953), using dibutyl phthalate as the oil, on 5 g of silica.

The mean area of the aggregate was determined in accordance with the standard ASTM D 3849-80, adapted to the specific character of the silica, by deagglomerating the silica by crushing a paste formed from 100 mg of dry silica powder and 0.5 ml of glycerin and then diluting that paste in 300 ml of water at a pH of 3.

The techniques for determining the inter-aggregate pore volume and determining the population of pores corresponding to that volume are carried out by means of a mercury-type porosimeter (porosimeter used: "pore sizer" 9300 marketed by COULTRONICS). The mercury is penetrated into the pores of the degassed sample, thus establishing a porosity curve representing the variation in the volume of the pores in dependence on the pressure or the radius of the pores. The porosity curve is plotted using the method set forth by N. M. WILNSLOW and J. J. SHAPIRO in ASTM BULLETIN, page 39, February 1959.

The stacking of the aggregates creates an inter-aggregate porosity, the filling of which with the mercury will be shown by the appearance of a step on the porosity curve. The height of the step makes it possible to determine the inter-aggregate pore volume, while the slope of the step reflects dispersion of the population of pores. The derived curve has a peak configuration which becomes increasingly less pronounced in proportion to an increasing degree of homogeneity in respect of the population of the inter-aggregate pores.

The BET specific surface area is determined using the BRUNAUER-EMETT-TELLER method described in *Journal of the American Chemical Society*, volume 60, page 309 (February 1938).

Moreover, the silicas according to the invention may be prepared as described in published French patent application No. 84/11004.

Such published application relates to a process for producing a silica by reaction between an aqueous solution of an alkaline silicate and an acidifying agent, by the formation of a bottoms product containing an aqueous substance and simultaneous addition of the acidifying agent and the alkaline silicate solution. That process is characterized in that:

(a) the reactants are added at a constant volume and the reaction medium is continuously drawn off, in such fashions as to provide in the constant volume a spheroidal colloid of silica which is monodispersed or polydispersed in respect of diameter size and, in the drawn-off material, a colloid of silica which is polydispersed in respect of diameter size;

(b) at least a portion of the product obtained in step (a) is reacted with an electrolyte; and (c) the product obtained in step (b) is consolidated by the addition of a solution of silicate and an acidifying agent.

Moreover, silicas which are especially desirable for use according to this invention may also be prepared according to the process of published French patent application No. 84/05460.

The process which is described in this particular application comprises the following steps:

(a) the formation of a bottoms product containing a portion of the total silicate;

(b) the addition of an acid until gelation occurs;

(c) discontinuing addition of the acid and aging of the gel;

(d) addition of acid;

(e) post-treatment;

(f) filtration, washing and drying of the dispension and recovery of the product obtained.

This process is characterized in that:

(i) the bottoms fraction in step (a) contains from 60 to 100% by weight of the silicate;

(ii) in step (b), the time/temperature parameter is adjusted to initiate gelling in 10 to 50 minutes;

(iii) gelling is terminated in from 5 to 30 minutes;

(iv) after termination of gelling, the addition of acid is resumed until a pH is reached at most equal to 9, followed by post-treatment at a pH from 7 to 9; and (v) an electrolyte is introduced in at least one of the steps (a), (b), (c), (d) and (e).

The silicas which are thus prepared may be incorporated into the elastomer in any known manner.

It will be appreciated that the silicas according to the invention can be used for any type of elastomers, such as, for example, polybutadiene, natural rubber, polyisoprene, of the type EPDM, and the like.

In order to further illustrate the present invention and the advantages thereof, the following specific examples are given, it being understood that same are intended only as illustrative and in nowise limitative.

EXAMPLE 1

Six silicas $S_1$, $S_2$, $S_3$, $S_4$, $S_5$ and $S_6$ were tested.

These were incorporated into an elastomer SBR 1502 in a proportion of 50%. A portion of the sample was diluted to a proportion of 5%, the remainder being used to prepare testpieces for mechanical tests.

The procedure followed involved, on the one hand, analysis of the sizes of the particles in respect of the fraction of mixture which had been diluted and, on the other hand, mechanical tests.

Analysis of particle sizes

The observations were made on thinly cut sections ($\simeq 150$ nm).

Having regard for the mechanical properties of the crude mixtures, the cut sections were produced in the cold state by means of a cryogenic ultramicrotome (REICHERT OMU 3, glass blade at $-90°$ C.). The sections were collected by means of a DMSO/water mixture, a mixture which was liquid at $-90°$ C., washed with water and deposited onto electron microscope grids.

The sections were investigated using an electron microscope, JEOL TEMSCAN 1200 EX.

After a first examination in the conventional transmission mode (CTEM), the sections were studied in the scanning transmission mode (STEM) under an acceleration voltage of 120 kv with a magnification of 80,000. This mode of operation permitted transfer of the STEM image into a memory of the image analyzer (Quantimet 900 from Cambridge), by means of a specific interface.

Display of the video signal on one of the monitors of the scanning unit permitted the operator to do the following:

(a) optimize the settings of the STEM detector (background noise, brilliance, contrast); and (b) transmit a relatively standardized signal to the image analyzer.

Image analysis

After the video signal had been sent into an analog-digital converter and after digitization by a 6 bit processor, an image was formed having 630,000 points or pixels, each pixel having a gain level value of from 0 to 64. One pixel represents a surface area of 10.24 nm$^2$.

Depending upon the quality of the initial signal, a simple blank followed by a closure procedure (expansion then erosion) and an opening procedure (erosion and expansion) of 1 and then 2 pixels made it possible to obtain a binary image which was representative of the objects present in the field of observation. The algorithms of the operating software of the QTM 900 then made it possible to carry out the following procedures on that image:

(i) to count the objects present;

(ii) for each of the objects, to measure the following parameters in respect of size:
* surface area: S,
* perimeter: P,
* greatest length: L,
* smallest length: l, (iii) to calculate the following parameters in respect of form:
* circularity: $P^2/4\pi S$,
* anisotropy: $L/l$.

Each sample was characterized by a population of 3000 objects emanating from about 30 fields, resulting from the examination of three different sections.

Although it was possible to estimate the spatial resolution under magnification conditions at 220 nm$^2$, objects of a size of smaller than 500 nm$^2$, which may be apparent objects resulting from the image analysis procedures, were eliminated.

Fine analysis of the distribution in respect of size of the particles of silica indicated a bimodal distribution. A first population of small particles, which was centered on the value of $\overline{S_1}$ and a second population of larger particles, which was centered on $\overline{S_2}$, were determined.

The minimum on the distribution curve was located in the vicinity of 20,000 nm$^2$.

The results of the different measurements made are reported in Table I.

TABLE 1

| Reference silica | CTAB area (m2/g) | Mean projected area** | Distribution 1 500–20,000 nm$^2$ | | Distribution 2 20,000–600,000 nm$^2$ | | % S* surface area |
|---|---|---|---|---|---|---|---|
| | | | $\bar{S}_{12}$ nm | % by number $n_1$ | $\bar{S}_{22}$ nm | % by number $n_2$ | |
| S$_1$ | 170 | 12,000 | 3,287 | 96.3 | 47,163 | 3.7 | 35.5 |
| S$_2$ | 160 | 15,000 | 3,317 | 97.9 | 39,676 | 2.1 | 21 |
| S$_3$ | 96 | 15,000 | 4,543 | 92.2 | 46,050 | 7.8 | 46.3 |
| S$_4$ | 98 | 25,000 | 4,305 | 94.1 | 33,795 | 5.9 | 33 |
| S$_5$ | 65 | 27,000 | 4,578 | 86.5 | 53,465 | 13.5 | 64.7 |
| S$_6$ | 65 | 32,000 | 4,649 | 89 | 39,806 | 11 | 31.5 |

*% in respect of surface area of the second population
**measured on the powder before introduction into the elastomer The silicas S$_1$, S$_3$ and S$_5$ were conventional commercial silicas, whereas silicas S$_2$, S$_4$ and S$_6$ were silicas which were selected in accordance with the criteria of the present invention.

A marked reduction in the percentage by number and in particular in respect of surface area of the particles of large sizes (distribution 2) was noted in the case of the silicas in accordance with the invention. This reflects a dispersion of said silicas in the elastomer, which was better than in the case of the conventional silicas.

Moreover, that improved dispersion has after-effects in regard to the mechanical properties of the vulcanizates. This will be seen from the following Example 2.

EXAMPLE 2

Preparation of the Testpieces for Mechanical Tests

The mechanical properties of the filled vulcanizates depend both on the filler and on the lattice structure of the elastomer.

For a valid comparison between the different fillers, all other conditions being equal, to the extent possible the same elastomer cross-linking conditions were used.

To reduce the effect of adsorption of the vulcanization agents at the surface of the silica and, consequently, differences in cross-linking, and in order to provide for good wetting of the filler particles by the elastomer, bis-propyltriethoxysilane tetrasulfide was used as the coupling agent.

The amount of that coupling agent was adjusted in dependence on the specific surface area of the silica, in order to theoretically provide that the filler was totally covered.

The formula used for preparation of the testpieces was as follows:

| | | |
|---|---|---|
| (i) | SBR 1502 | 100 |
| (ii) | ZnO | 4 |
| (iii) | Stearic acid | 1.5 |
| (iv) | CBS (accelerator) | 2 |
| (v) | Sulfur | 1 |
| (vi) | PEG (polyethyleneglycol) | variable |
| (vii) | Silica | 50 |
| (viii) | Silane | variable |

The silane and the PEG were adjusted in dependence on the specific surface area of the silica, on the basis, respectively, of 10 g and 2 g for 100 g of silica having a value of 170 m$^2$/g.

The mixtures were produced in two phases, using an open mixer:

(a) first, the silane and then the silica were incorporated, to permit the former to be uniformly distributed on the surface of the latter;

(b) once the incorporation operation had been concluded, the other components of the mixture were added. This procedure prevented the accelerator from being absorbed on the surface of the filler, and the level of concentration thereof, in the mass of the elastomer, was maintained constant.

Vulcanization was carried out at a temperature of 160° C. on the basis of the information from the MONSANTO rheometer.

The mechanical tests were carried out in accordance with the ASTM standards.

The results of the measurements are reported in Table II below:

$R_R$: ultimate tensile strength (NF T 46-002)
$R_D$: tear strength (NF T 46-007).

TABLE II

| Reference silica | CTAB area | $R_R$ MPa | $R_D$ KN/m |
|---|---|---|---|
| S$_1$ | 170 | 22.7 | 11.7 |
| S$_2$ | 160 | 25.3 | 13.1 |
| S$_3$ | 96 | 19.6 | 10.8 |
| S$_4$ | 98 | 23.0 | 12.1 |
| S$_5$ | 65 | 18.3 | 9.8 |
| S$_6$ | 65 | 21.0 | 12.3 |

It will be seen that the silicas which are selected in accordance with the invention impart to the vulcanizate levels of ultimate tensile strength and tear strength which are higher than in the case of the conventional silicas.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An elastomeric shaped article having improved tensile strength and tear strength which comprises a reinforcing amount of a particulate silica filler material for said elastomeric shaped article, said silica filler material comprising at least one precipitated silica having (i) a CTAB surface area of from 20 to 200 m$^2$/g, (ii) a mean projected area of aggregates of greater than about 10,000 nm$^2$, and (iii) an inter-aggregate volume of at least 1 cm$^3$/g and (iv) a DPB oil absorption capacity no greater than 300 ml/100 g, and an essentially homogeneous inter-aggregate pore population wherein:

(a) for a CTAB surface area of from 20 to 70 m²/g, the mean projected area of aggregates is at least about 30,000 nm²;
(b) for a CTAB surface area of from 70 to 120 m²/g, the mean projected area of aggregates is at least about 25,000 nm²; and
(c) for a CTAB surface area of from 120 to 200 m²/g, the mean projected area of aggregates is at least about 15,000 nm².

2. The elastomeric shaped article as defined by claim 1, said at least one precipitated silica having a CTAB surface area of from 20 to 70 m²/g, and a mean projected area of at least about 30,000 nm².

3. The elastomeric shaped article as defined by claim 1, said at least one precipitated silica having a CTAB surface area of from 70 to 120 m²/g, and a mean projected area of at least about 25,000 nm².

4. The elastomeric shaped article as defined by claim 1, said at least one precipitated silica having a CTAB surface area of from 120 to 200 m²/g, and a mean projected area of at least about 15,000 nm².

5. The elastomeric shaped article as defined by claim 4, said at least one precipitated silica having a DBP oil absorption capacity no greater than 300 ml/100 g.

6. The elastomeric shaped article as defined by claim 1, said at least one precipitated silica having a CTAB surface area of from 20 to 120 m²/g, and a DBP oil absorption capacity no greater than 300 ml/100 g.

7. The elastomeric shaped article as defined by claim 1, the ratio of BET surface area/CTAB surface area of said at least one precipitated silica ranging from about 1 to 1.2.

8. The elastomeric shaped article as defined by claim 1, comprising a tire.

* * * * *